US012665927B2

(12) United States Patent
Douglas

(10) Patent No.: US 12,665,927 B2
(45) Date of Patent: Jun. 23, 2026

(54) SYSTEMS AND METHODS FOR INTERCEPTING CONVERGENT DATA STREAMS

(71) Applicant: Capital One Services, LLC, McLean, VA (US)

(72) Inventor: Lawrence Douglas, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 106 days.

(21) Appl. No.: 18/391,493

(22) Filed: Dec. 20, 2023

(65) Prior Publication Data

US 2025/0211611 A1　　Jun. 26, 2025

(51) Int. Cl.
*H04L 9/40* (2022.01)

(52) U.S. Cl.
CPC ........ *H04L 63/1466* (2013.01); *H04L 63/102* (2013.01); *H04L 63/1416* (2013.01)

(58) Field of Classification Search
CPC ............... H04L 63/1466; H04L 63/102; H04L 63/1416
See application file for complete search history.

(56) References Cited

U.S. PATENT DOCUMENTS

| | | | | |
|---|---|---|---|---|
| 10,936,589 | B1 * | 3/2021 | Beitchman | ........ G06F 16/24542 |
| 2011/0246634 | A1 * | 10/2011 | Liu | ......................... G06F 16/95 |
| | | | | 726/22 |
| 2011/0295773 | A1 * | 12/2011 | Fisher | ................... G06F 16/904 |
| | | | | 707/769 |
| 2016/0162701 | A1 * | 6/2016 | Rosenberg | .............. H04L 51/48 |
| | | | | 726/28 |
| 2017/0064556 | A1 * | 3/2017 | Gilad | ..................... H04W 48/08 |
| 2017/0237762 | A1 * | 8/2017 | Ogawa | ................. G06F 16/951 |
| | | | | 726/23 |
| 2021/0120033 | A1 * | 4/2021 | Gorrepati | ............ H04W 12/106 |
| 2022/0047209 | A1 * | 2/2022 | Shin | ...................... G06V 10/778 |
| 2022/0092346 | A1 * | 3/2022 | Jones | .................... G06F 18/285 |
| 2025/0028752 | A1 * | 1/2025 | Lauber | .................... G06F 40/30 |

* cited by examiner

*Primary Examiner* — Kristie D Shingles
(74) *Attorney, Agent, or Firm* — Foley & Lardner LLP

(57) ABSTRACT

Methods and systems for intercepting convergent data streams. In some aspects, the system may, in response to receiving a first data stream including a plurality of user activities executed by a user, generate a first projected future data stream. The first projected future data stream can include potential future activities for the user. The system may process the first projected future data stream to determine a first cluster to associate with the user. Furthermore, the system may determine whether the first cluster is a type of intervention cluster requiring direction to the user for future activity. In response to determining that the first cluster is a type of intervention cluster, the system may generate a notification to the user including one or more user activities to execute to exit the first cluster. This allows the system to prevent or intercept undesired activities executed by users.

20 Claims, 4 Drawing Sheets

200

216

214

212

210

202

206

208

204

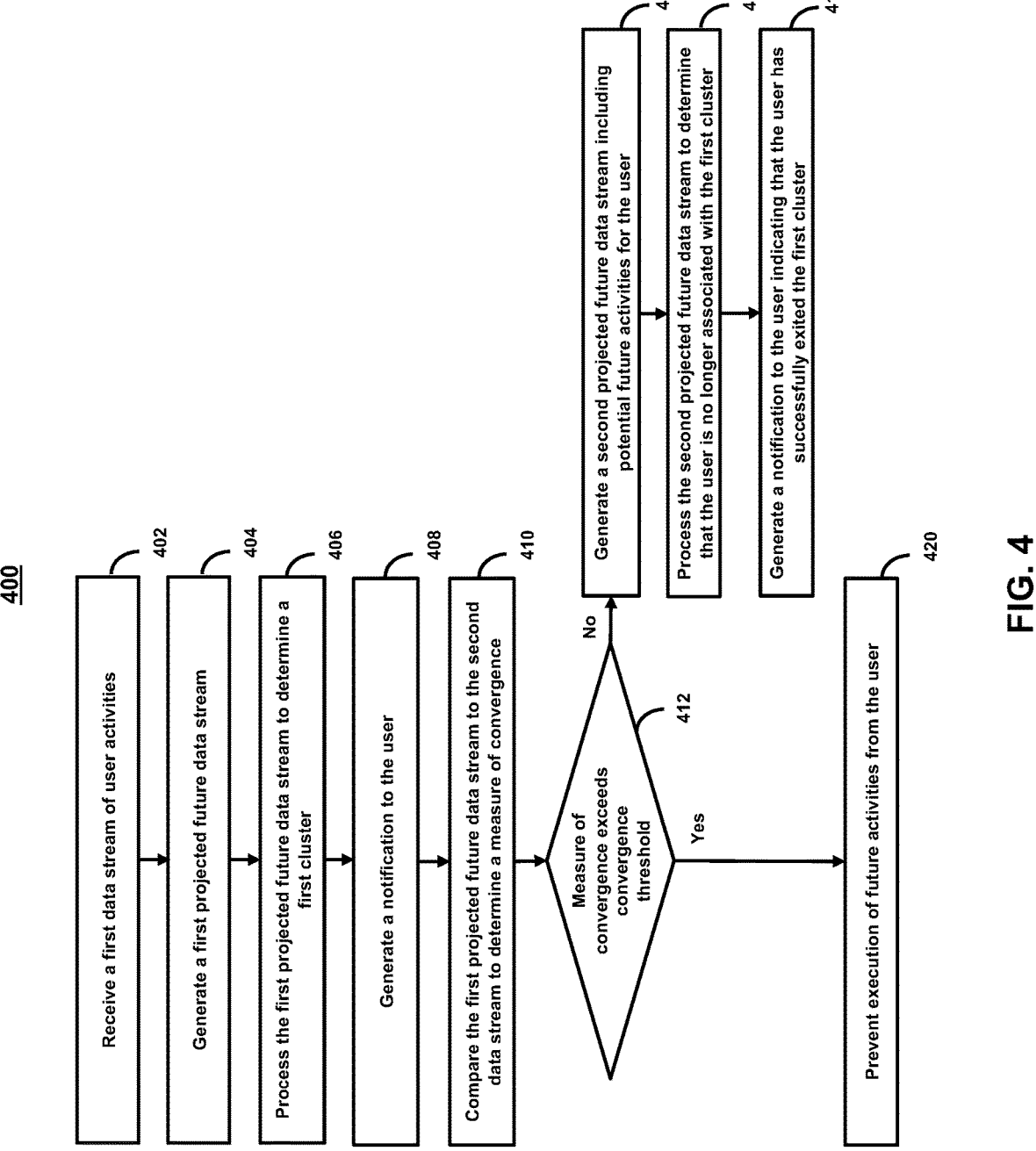

400

Receive a first data stream of user activities — 402

Generate a first projected future data stream — 404

Process the first projected future data stream to determine a first cluster — 406

Generate a notification to the user — 408

Compare the first projected future data stream to the second data stream to determine a measure of convergence — 410

Measure of convergence exceeds convergence threshold — 412

No

Generate a second projected future data stream including potential future activities for the user — 414

Process the second projected future data stream to determine that the user is no longer associated with the first cluster — 416

Generate a notification to the user indicating that the user has successfully exited the first cluster — 418

Yes

Prevent execution of future activities from the user — 420

FIG. 4

SYSTEMS AND METHODS FOR INTERCEPTING CONVERGENT DATA STREAMS

SUMMARY

In today's highly connected world, computer networks are constantly under the threat of malicious attacks from bad actors. Security incidents can lead to data breaches, organizational loss, and reputational damage. Implementing measures to protect against a security breach can reduce the likelihood of data breaches, organizational loss, reputational damage, or other negative consequences from a security incident. Traditionally, these measures can include security hardware (e.g., a firewall or intrusion prevention/detection systems), software (e.g., antivirus, virtual private networks, or security information and event management systems), and policies (e.g., security policy, incident response plans). These measures can be applied throughout a business and separately or in conjunction for a more robust security posture. However, despite these benefits and despite the wide-ranging number of potential applications, several technical problems have hindered practical implementations.

First, it may be challenging, to use traditional measures for protecting against a security breach, to protect against attacks caused by human error (e.g., phishing emails, suspicious downloads, weak passwords). For example, a firewall may not be able to detect a weak password. Second, traditional measures can often emphasize technical controls such as firewalls, antivirus software, or intrusion detection systems, which may not preempt user error. For example, traditional measures may omit security measures that preempt undesired user activities, such as downloading suspicious files or clicking unknown links in a suspicious email. Finally, organizations typically have a reactionary approach when responding to incidents involving human errors. Reactionary actions organizations take can include providing employee training, adding security hardware or software, and other preemptive security measures after a security incident occurs. These technical problems may present an inherent problem with generating a system to prevent or intercept undesired activities executed by users, thereby preempting a poor user decision and mitigating activities executed by a user which result in a negative impact on the user and/or the system prior to the user executing them (e.g., correcting weak credentials, phishing training, and security training).

Methods and systems are described herein for novel uses and/or improvements to artificial intelligence applications. As one example, methods and systems are described herein for mitigating activities with a negative impact on the user prior to the user executing them. Activities with a negative impact may be observed in a secure network environment, such as using weak credentials (e.g., short passwords or reused passwords) or responding incorrectly to a phishing email (e.g., clicking malicious links or responding). However, activities with negative impacts that can be mitigated extend beyond those observed in a secure network environment.

Conventional credentialing systems do not project future user activities. Furthermore, conventional credentialing systems do not assess each projected user activity for potential negative impact on the user and/or the system. For example, conventional systems may not be able to prevent activities that negatively impact the user and/or the system because conventional systems may only review suspicious past user activity and aggregate suggestions to prevent undesired consequences in the future. However, for the system to have sufficient information to generate the suggestions, the user would have already had to execute a number of undesirable activities that would have negatively impacted the user and/or the system. Waiting until there is a negative impact on the user and/or the system may defeat the purpose of aggregating suggestions to prevent activities that negatively impact the user and/or the system. The difficulty in adapting artificial intelligence models for this practical benefit faces several technical challenges such as how to project and mitigate negative user activities without relying solely on past negative activities from the user to prevent undesired consequences on the user and/or the system.

To overcome these technical deficiencies in adapting artificial intelligence models for this practical benefit, methods and systems disclosed herein include a model that generates a projected future data stream that predicts future activities for the user, assigns a cluster to the user, and recommends activities to the user to get them out of the cluster. By projecting future activities and recommending activities to diverge the user from the cluster, the model can effectively prevent the user from making activities that produce undesired consequences to the user and/or the system without relying on previous activities the user made, resulting in undesired consequences. For example, the system can prevent users from executing activities that will result in undesired consequences by comparing the projected future data stream to the corresponding data stream of the user, and determining the measure of convergence. Furthermore, users may exit their initial cluster if they executed the recommended activities. Accordingly, the methods and systems provide the benefit of mitigating activities executed by a user that result in a negative impact on the user and/or the system prior to the user executing them (e.g., weak credentials or poor performance in response to a phishing email).

In some aspects, methods and systems are designed to direct future activity to diverge from a projected future data stream generated based on past activity. This is done by, in response to receiving a first data stream, including a plurality of user activities executed by a user, and generating, based on the first data stream, a first projected future data stream including potential future activities for the user. The system then processes, using a clustering algorithm, the first projected future data stream to determine, from a plurality of clusters, a first cluster to associate with the user. In response to determining the first cluster, the system generates a notification to the user including one or more user activities to execute to exit the first cluster, and in response to receiving a second data stream associated with the user, the system compares the first projected future data stream to the second data stream to determine a measure of convergence. In response to determining that the measure of convergence does not exceed a threshold, the system generates, based on the second data stream, a second projected future data stream including potential future activities for the user. The system then processes, using the clustering algorithm, the second projected future data stream to determine that the user is no longer associated with the first cluster, and in response to determining that the user is no longer associated with the first cluster, the system generates a notification to the user indicating that the user has successfully exited the first cluster.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 4 shows a flowchart of the steps involved in generating a notification to the user and one or more user activities to execute to exit the first cluster, in accordance with one or more embodiments.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
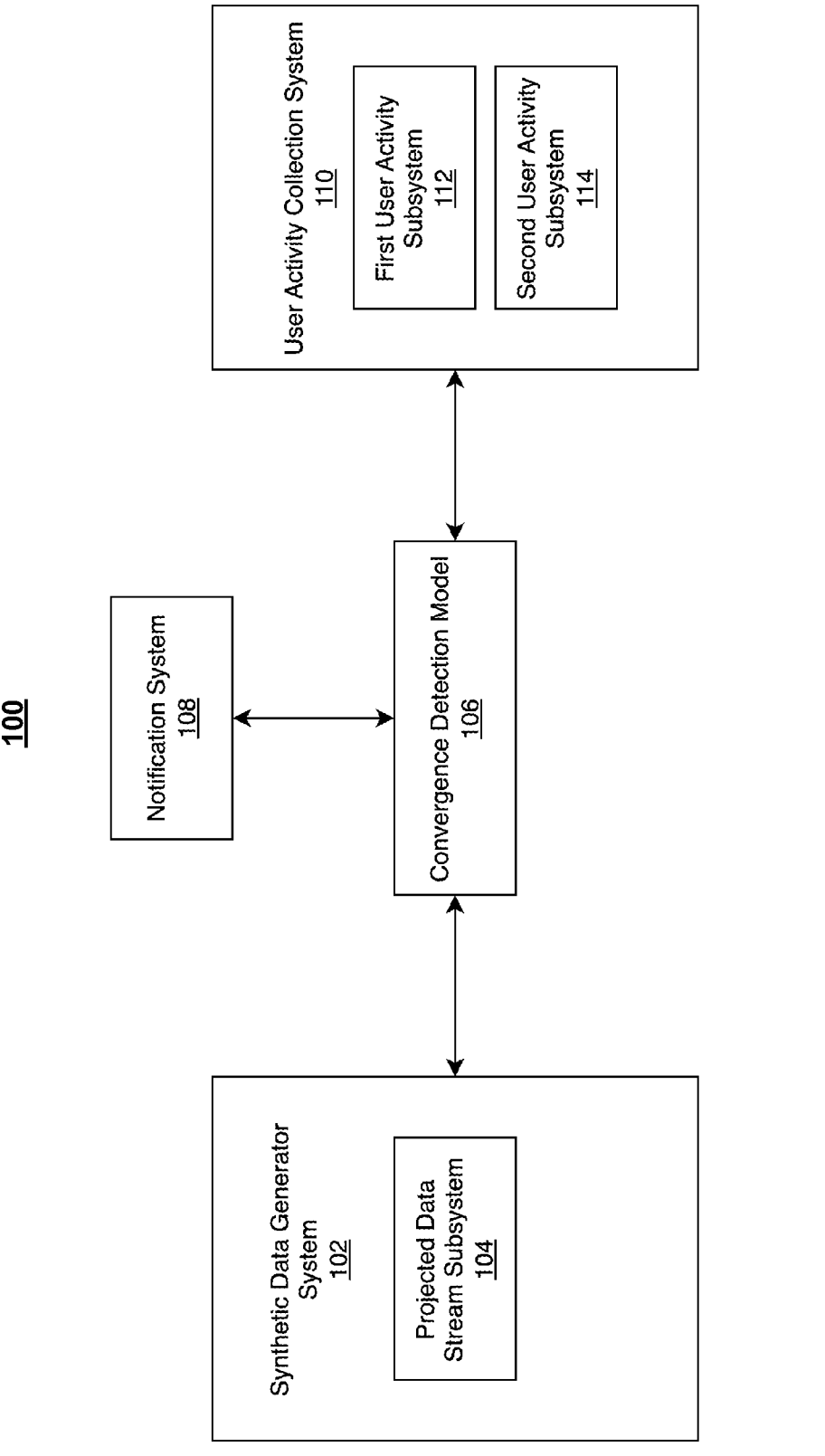
FIG. 1 shows an illustrative diagram for mitigating the execution of user activities that will have a negative impact on the user, in accordance with one or more embodiments.

FIG. 1 shows an illustrative diagram for mitigating the execution of user activities that will have a negative impact on the user, in accordance with one or more embodiments. For example, system 100 may include synthetic data generator system 102 which can assist in mitigating activities with a negative impact on the user prior to the user executing them (e.g., reckless spending, spending on addictions, using weak credentials, or interacting with a phishing email). Synthetic data generator system 102 may include projected data stream subsystem 104. Synthetic data generator system 102 may interact with convergence detection model 106. Convergence detection model 106 may interact with user activity collection system 110 and notification system 108. User activity collection system 110 may include first user activity subsystem 112 and second user activity subsystem 114.

Convergence detection model 106 may be responsible for determining the cluster associated with a user (e.g., intervention cluster or non-intervention cluster) based on the data received from user activity collection system 110. Specifically, convergence detection model 106 may receive data about a first user (e.g., spending habits or network activity) from first user activity subsystem 112. Additionally, the system may receive data corresponding to a second user (e.g., spending habits or network activity) from second user activity subsystem 114. Based on the information convergence detection model 106 received from user activity collection system 110, the model may transmit the received user data to synthetic data generator system 102. Synthetic data generator system 102 may be used to generate a projected data stream for both the first user and the second user.

The projected data stream, generated by projected data stream subsystem 104, may include potential future activities that the user associated with the projected data stream may execute. For example, if a user is spending recklessly, or failing to attend mandatory security training sessions, the system may use synthetic data generator system 102 to generate a projected data stream associated with the user. In this example, the projected data stream associated with the user could include activities or actions such as failing to reduce reckless spending (e.g., if the user is still making reckless purchases) or interacting with phishing emails (e.g., if the user is not attending training sessions). The synthetic data generator system 102 may do this by using the projected data stream subsystem 104. After generating the projected data stream associated with both the first user and the second user, the synthetic data generator system 102 may send the information to the convergence detection model 106.

System 100 may include a clustering algorithm, which can cluster the projected data stream from projected data stream subsystem 104. For example, if projected data stream subsystem 104 generates data indicating that a user will spend recklessly the system may include the user in a cluster with similar users (e.g., users who are spending recklessly). The clustering algorithm could be included in convergence detection model 106. Convergence detection model 106 may transmit the information from synthetic data generator system 102 to notification system 108.

Notification system 108 may be able to generate a notification for the user. The notification generated by notification system 108 could include one or more user activities to execute to exit the cluster. For example, if the cluster denotes users who are spending recklessly, the notification system may generate a notification that includes activities, such as creating a budget or meeting with a financial advisor. Creating a budget, and meeting with a financial advisor could reduce the user's reckless spending.

For example, FIG. 1 illustrates how determining that the measure of convergence exceeds a threshold, solves the technical challenge of how to identify users who are going to execute undesired activities by using user data streams in a manner to predict and mitigate undesired consequences stemming from those user activities. For example, the system can determine if the measure of convergence exceeds a threshold, and then take appropriate steps to provide additional future activities for the user to help ensure undesired activities are not performed, repeated, or continued (e.g., generating a notification). As such, the system may prevent or mitigate undesired activities from a user that would result in negative consequences to the user or to a system, to which the user has access.

The system may be used to process and interpret a user's data stream. In disclosed embodiments, a data stream may include a continuous flow of data that encapsulates all user activities across an account or a network system. This may include streaming data (e.g., as found in streaming files) or may refer to data that is received from one or more sources over time (e.g., either continuously or in a sporadic nature). For example, the data stream could include information from social media, GPSs, financial accounts, system accounts, or other data associated with the user. By processing and interpreting a user's data stream, the system may be able to identify potentially harmful or undesired actions. The system may prompt or alert a user by generating a notification, which could include recommended activities to divert the user's current actions. A data stream segment may refer to a state or instance of the data stream. For example, a state or instance may refer to a current set of data corresponding to a given time increment or index value. For example, the system may receive time series data as a data stream. A given increment (or instance) of the time series data may correspond to a data stream segment.

The system may be used to receive a plurality of user activities. In disclosed embodiments, user activities can include actions performed by a user that are either benign, such as regular, reasonable purchases or attending a training session. Alternatively, user activities can include harmful, negative or undesired actions or activities, such as failing to attend a training session or making multiple expensive purchases in a short period of time. Additional examples of user activities can include regular transactions to hospitals or medical institutions, purchases related to medical treatments, drugs, or health supplements, multiple transactions with repair services, multiple transactions related to gambling services, unusually large data transfers, not attending security training sessions, or multiple interactions with phishing emails or training phishing emails. Further examples could include unauthorized system access, intentionally modifying security policies on the computer to gain unauthorized access, or repeatedly transmitting messages that are inappropriate or harassing in nature. The user activities may dictate past user activities, but may also be used in conjunction with the information of other users in the same cluster to predict future activities the user may execute.

The system may be used to generate projected future data. In disclosed embodiments, projected future data can include potential future activities the user may execute. The system can generate the projected future data by identifying multiple users, within the same cluster as the current user. For example, if a user is observed recklessly spending money, other users in the same cluster may also be recklessly spending money. Based on the similarities between the users, users that have effectively left that cluster (the reckless spending cluster, which is an intervention cluster) the system may be able to generate a notification with one or more activities for the user to execute to get out of the intervention cluster. For example, potential future activities for a user in a cluster corresponding to high spending may include additional large purchases or fewer large purchases.

The system may be used to generate a notification. In disclosed embodiments, a notification may include one or more user activities to execute to exit a cluster. The notification can come in the form of a push notification on a mobile device, a phone call, or a text message. The notification may be used to inform the user that they are in a specific cluster, or that they have successfully exited a specific cluster. For example, if the user is first notified of reckless spending, but, after a notification recommending meeting with a financial advisor, and establishing a budget, the user adheres to the advice by executing the recommended activities the system may generate a second notification to the user. The second notification can be sent to the user to inform the user that they are no longer in the reckless spending cluster, and have moved instead to a non-intervention cluster.

The system may be used to determine activities for a user to execute to exit a cluster. In disclosed embodiments, an activity for a user to execute to exit the cluster may include an activity performed by the user that deviates from the user activity associated with the cluster. For example, in the case of a user in the reckless spending cluster, a user who no longer recklessly spends because they have executed the action of establishing a budget, and meeting with a financial advisor would exit the reckless spending cluster and enter a different cluster. The activity of establishing a budget and meeting with a financial advisor are both activities for a user to execute to exit a cluster. Furthermore, these activities can be recommended to the user through a notification transmitted to the user through notification system 108.

The system may be used to determine a measure of convergence. In disclosed embodiments, the system may compare a projected future data stream to a data stream to determine a measure of convergence. The measure of convergence can be generated by convergence detection model 106. The measure of convergence can refer to a difference metric represented by a number. For example, the measure of convergence may be directly correlated to the similarity between the data stream and the projected data stream (e.g., if the measure of convergence is a larger value, it means that the data stream associated with the projected future data stream is more similar than a smaller value). Additionally, the measure of convergence may represent how closely a user's activities align with the activities predicted by the system at projected data stream subsystem 104.

Convergence detection model 106 may also establish a convergence threshold. A convergence threshold may refer to the limit value that determines if the data stream and the projected future data stream are too similar, which could indicate that the user is continuing to perform undesired or negative activities. Subsequently, the convergence threshold, if exceeded by the user, could prevent the system from reassigning the user's cluster or the system could prevent the execution of future activities from the user. If the convergence threshold is not exceeded, it could indicate that the undesired or negative activities associated with the user are lower. After determining that the convergence threshold is not exceeded, the system may generate the second projected future data stream. Eventually, the system may change the cluster the user is assigned to as the user may be performing activities that are divergent from the projected data stream.

A convergence threshold may indicate how divergent the future data stream and the data stream must be to exit the cluster. For example, if the measure of convergence does not exceed the convergence threshold the system may generate a second projected future data stream based on another data stream after the initial data stream. The second projected future data stream can include potential future activities for the user to exit the cluster (e.g., how to increase the measure of convergence). For example, if the measure of convergence has a value of 1 and the convergence threshold has a value of 3, the measure of convergence does not exceed the threshold. This may indicate that the user's data stream is divergent enough from the projected future data stream such that the user may exit the cluster.

Alternatively, if the measure of convergence exceeds the convergence threshold, the system may refrain from changing the user's current cluster. For example, if the measure of convergence has a value of 5 and the convergence threshold has a value of 3, the measure of convergence exceeds the threshold, which may indicate that the user's data stream and the projected data stream are not divergent enough to exit the cluster. After determining that the measure of convergence exceeds the convergence threshold, the system may prevent the execution of future activities by the user.

Furthermore, the measure of convergence is determined by the system to gain more insight into whether the user executed activities generated by the system in the notification. If the measure of convergence does not exceed the threshold, it does not mean that the user necessarily adhered to or executed the activities recommended by the system, but rather that the user did not execute the activities similar to those projected by projected data stream subsystem 104.

The system may be used to determine a negative activity executed by a user. In disclosed embodiments, a negative activity executed by a user can include an activity with negative consequences to the user or for a system or network the user is accessing. Examples of negative activities include reckless spending, frequent large purchases, not attending security training sessions, or other activities that result in negative consequences to the user or the systems with which the user is interacting.

As referred to herein, content should be understood to mean an electronically consumable user asset, such as Internet content (e.g., streaming content, downloadable content, Webcasts, etc.), video clips, audio, content information, pictures, rotating images, documents, playlists, websites, articles, books, electronic books, blogs, advertisements, chat sessions, social media content, applications, games, and/or any other media or multimedia and/or combination of the same. Content may be recorded, played, displayed, or accessed by user devices, but can also be part of a live performance. Furthermore, user-generated content may include content created and/or consumed by a user. For example, user-generated content may include content created by another, but consumed and/or published by the user.

The system may monitor content generated by the user to generate user profile data. As referred to herein, a user profile and/or user profile data may comprise data actively and/or passively collected about a user. For example, the user profile data may comprise content generated by the user and a user characteristic for the user. The user profile data may also include one or more data streams associated with the user. A user profile may include content consumed and/or created by a user.

User profile data may also include a user characteristic. As referred to herein, a user characteristic may include about a user and/or information included in a directory of stored user settings, preferences, and information for the user. For example, a user profile may have the settings for the user's installed programs and operating system. In some embodiments, the user profile may be a visual display of personal data associated with a specific user, or a customized desktop environment. In some embodiments, the user profile may be a digital representation of a person's identity. The data in the user profile may be generated based on the system actively or passively monitoring.

Figure 2:
FIG. 2 shows an illustrative diagram for generating, based on the first data stream, a first projected future data stream, and a notification to the user, in accordance with one or more embodiments.

FIG. 2 shows an illustrative diagram for generating, based on the first data stream, a first projected future data stream, and a notification to the user, in accordance with one or more embodiments. Process 200 may include user 202 and user 204. User 202 and user 204 may interact with process 200 through the use of a mobile device, such as a desktop computer, or mobile device. User 202 and user 204 can generate data streams such as data stream 206, which can correspond to user 202, and data stream 208, which can correspond to user 204. Data stream 206 and data stream 208 may be input into model 210. Model 210 may be responsible for clustering user 202 and user 204 based on the data in data stream 206 and data stream 208, respectively. The cluster can be an intervention cluster such as intervention cluster 214 or the cluster can be a non-intervention cluster, such as non-intervention cluster 212. If model 210 determines that user 202 or user 204 is performing activities that require intervention model 210 may place user 202 or user 204 into intervention cluster 214. After being placed into intervention cluster 214, the system may generate a notification such as notification 216. The notification may include one or more user activities to execute to exit the first cluster (e.g., exit intervention cluster 214).

For example, user 202 can be spending recklessly, as evidenced by data stream 206. Data stream 206 can stream account information from the bank account of user 202. User 204 can be executing expected spending actions (i.e., non-reckless spending including adhering to a budget or not accruing debt), as evidenced by data stream 208. Data stream 208 can stream account information from the bank account of user 204. Data stream 206 and data stream 208 may be input into model 210. Model 210 may recognize that user 202 is spending recklessly in a manner that requires intervention, and thus the system may cluster user 202 in intervention cluster 214. Alternatively, model 210 may recognize that user 204 is not spending recklessly and thus may cluster user 204 into non-intervention cluster 212. Since user 204 may not be performing any negative actions, the system may decide not to generate a notification for user 204. Alternatively, because user 202 is performing negative activities (e.g., reckless spending) the system may decide to generate notification 216.

Notification 216 may include one or more activities for user 202 to execute to exit the intervention cluster 214. These activities can include a meeting with a financial advisor, or establishing and adhering to a budget. Notification 216 may be transmitted and presented to user 202. After user 202 received notification 216, they may decide to execute an activity proposed by notification 216. If the user decides to execute one or more of the activities in notification 216, it will be apparent through data stream 206. After model 210 determines that the user has executed one or more of the activities proposed in notification 216 or determines that the user is no longer spending recklessly, model 210 may decide to allow user 202 to exit intervention cluster 214 and assign user 202 to non-intervention cluster 212.

The system may cluster users, generate a predicted data stream, and generate a notification with one or more activities for the user to execute to exit the cluster. By doing so, the system can prevent users from executing undesired activities with negative consequences to the user or the systems the users are using. The system overcomes the technical challenge of how to intercept and prevent undesired user activities by generating data streams, clustering users, and generating recommended activities for the user to execute.

The system may receive one or more data streams from users. In disclosed embodiments, a data stream of user activities may include information from social media, GPS, financial accounts, system accounts, or other data associated with the user. In some embodiments, the system may receive the user data streams by requesting, from the user, access to one or more accounts, including bank accounts, network access accounts, or other accounts associated with the user. The system may receive the user data streams if the users voluntarily transmit or provide access to the accounts without prompting by the system. Furthermore, the system may access data (e.g., account data, transaction data, or usage data) from third-party accounts (e.g., banking accounts, network accounts, social media accounts, shopping accounts, healthcare accounts, or fitness or health app accounts) associated with the user which can include additional user activities. For example, by receiving the data stream from the user, the system may have access to the information required to mitigate undesired consequences from a user executing a negative action.

The system may generate a notification to users that includes activities to execute to exit the cluster. In disclosed embodiments, the generated notification may include activities the user can execute to exit the cluster. The activities can include creating a budget, refinancing a loan, creating a new savings account, increasing investments, using a tool for cybersecurity (e.g., a password manager or hardware token), changing a password, or refraining from using a device during a certain period.

In some embodiments, the system may generate the notification by using push notifications sent to a user's mobile or desktop device from the system. Other notification delivery methods can include email notifications, text notifications, desktop notifications, or social media notifications. Another component of the notification is the activities to execute to exit the cluster. The system may determine the appropriate activities for the user to execute to exit a cluster by identifying other users in the same cluster and corresponding activities executed by those other users. The system may identify one or more of the notifications that were sent to one or more of the other users to determine if those notifications were effective (e.g., that they mitigated one or more negative consequences stemming from the user executing activities). Specifically, the system can make this determination by identifying activities associated with each of the other users before any notification was sent and comparing those activities to the user activities after a notification was sent and after the user executed the activities suggested in the notification. The system can ensure that the user completed or executed the activity suggested in the notification by either observing changes in one or more user accounts or user data streams or by receiving manual confirmation from the user that one or more of the activities suggested in the notification were executed. The system can then determine that the activities associated with each of the other users, and the associated activities mitigated a negative consequence for the user. Therefore, the system may be able to generate a notification similar to the notification provided to one of the other users. The notification can include similar activities the user can execute to exit the first cluster.

Figure 3:
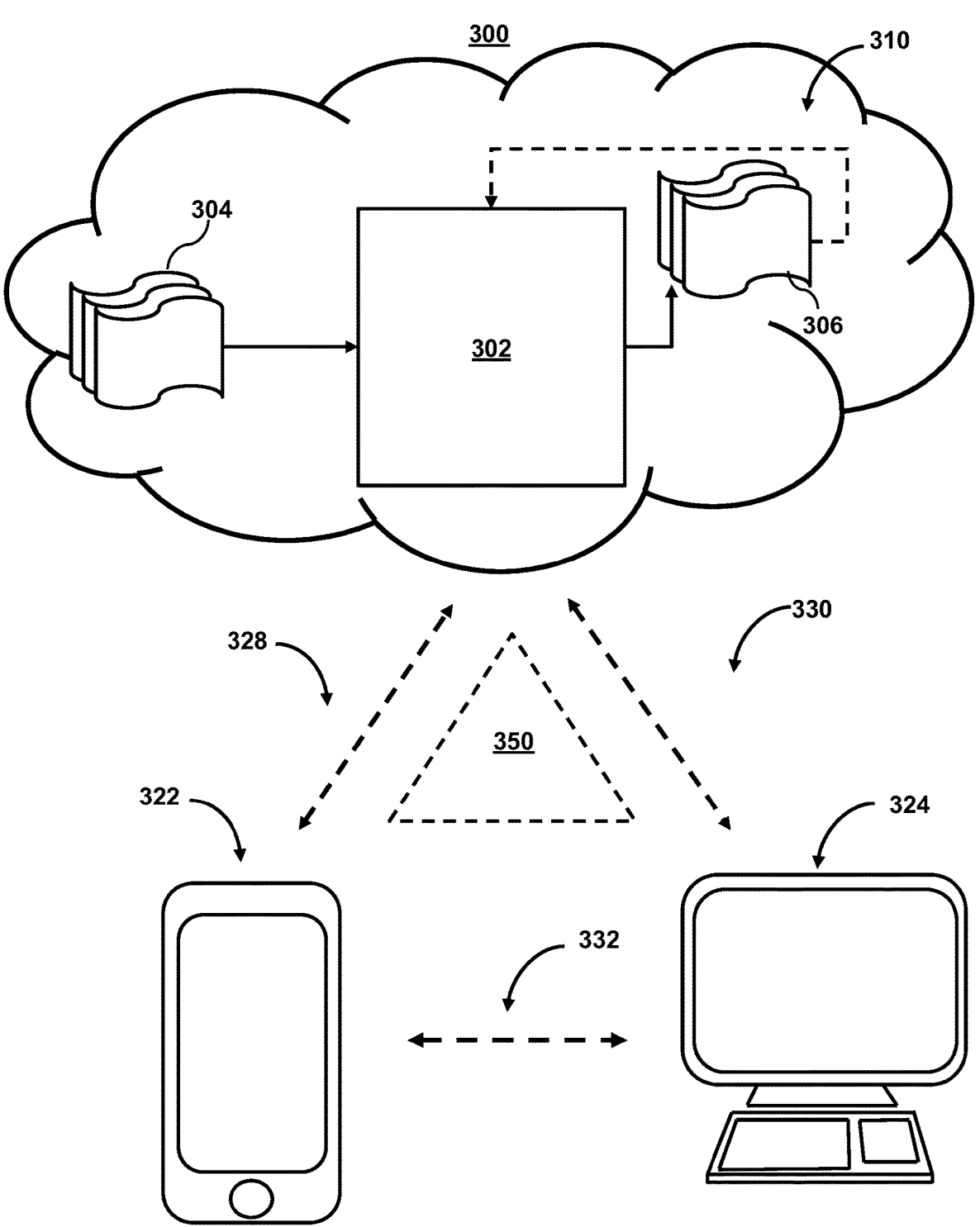
FIG. 3 shows illustrative components for a system used to generate a notification to the user and one or more user activities to execute to exit the first cluster, in accordance with one or more embodiments.

FIG. 3 shows illustrative components for a system used to generate a notification to the user and one or more user activities to execute to exit the first cluster, in accordance with one or more embodiments. For example, FIG. 3 may show illustrative components for preventing a user from executing activities with negative impacts such as reckless spending, or improper security practices (e.g., interacting with phishing emails). As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system, and may feature one or more component devices. It should also be noted that system 300 is not limited to three devices. Users may, for instance, utilize one or more devices to interact with one another, one or more servers, or other components of system 300. It should be noted, that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational response, queries, and/or notifications).

Additionally, as mobile device 322 and user terminal 324 are shown as touchscreen smartphones, these displays also act as user input interfaces. It should be noted that in some embodiments, the devices may have neither user input interfaces nor displays, and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include notification system 108, user activity collection system 110, convergence detection model 106, and/or synthetic data generator system 102.

Cloud components 310 may access projected data stream subsystem 104, first user activity subsystem 112, second user activity subsystem 114, or data streams including a plurality of user activities executed by a user (e.g., data stream 206 or data stream 208).

Cloud components 310 may include model 302, which may be a machine learning model, artificial intelligence model, etc. (which may be referred collectively as "models" herein). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., future reckless spending, large upcoming payment, increased vulnerabilities).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., reckless spending or failing to adhere to security policies).

In some embodiments, the model (e.g., model 302) may automatically perform activities based on outputs 306. In some embodiments, the model (e.g., model 302) may not perform any actions. The output of the model (e.g., model 302) may be used to categorize users based on user activity and/or identify one or more user activities to execute for inclusion in a notification.

System 300 also includes API layer 350. API layer 350 may allow the system to generate summaries across different devices. In some embodiments, API layer 350 may be implemented on mobile device 322 or user terminal 324. Alternatively or additionally, API layer 350 may reside on one or more of cloud components 310. API layer 350 (which may be A REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PUP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web-services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use a developer portal. API layer 350 may use strong security constraints applying WAF and DDoS protection, and API layer 350 may use RESTful APIs as standard for external integration.

FIG. 4 shows a flowchart of the steps involved in generating a notification to the user and one or more user activities to execute to exit the first cluster, in accordance with one or more embodiments. For example, the system may use process 400 (e.g., as implemented on one or more system components described above) in order to mitigate activities with a negative impact on the user prior to the user executing them (e.g., reckless spending, spending that indicates addictions, weak credentials, or poor performance in response to a phishing email).

At step 402, process 400 (e.g., using one or more components described above) receives a first data stream of user activities. For example, the system may receive a first data stream including a plurality of user activities executed by a user. For example, the first data stream may include transaction history associated with the user (e.g., recent purchases, average cost, or number of purchases). By receiving the first data stream of user activities, the system can obtain a set of data representing an overview of the user's purchases and can extrapolate various insights regarding the user.

At step 404, process 400 (e.g., using one or more components described above) generates a first projected future data stream. For example, the system may, in response to receiving a first data stream including a plurality of user activities executed by a user, generate, based on the first data stream, a first projected future data stream including potential future activities for the user. For example, potential future activities for the user may include making many purchases in a short duration or making purchases at a specific venue. By generating a first projected future data stream, the system may anticipate future activities the user may perform so the system can provide relevant advice, recommendations, planning support, or fraud detection and notifications for the user.

At step 406, process 400 (e.g., using one or more components described above) processes the first projected future data stream to determine a first cluster. For example, the system may process, using a clustering algorithm, the first projected future data stream to determine, from a plurality of clusters, a first cluster to associate with the user. For example, clusters can be based on anticipated future purchases (e.g., observing installments on a payment plan may indicate further installments at predictable intervals). In addition, clusters can include groups of individuals with similar experiences such as health events, car repairs, family loss, addiction indicators, the birth of a child, or loss or change of job. By processing the first projected future data stream to determine a first cluster, the system may be able to study the clusters for common scenarios to improve the model to offer more relevant and useful assistance to users.

At step 408, process 400 (e.g., using one or more components described above) generates a notification to the user. For example, in response to determining the first cluster, the system may generate a notification to the user including one or more user activities to execute to exit the first cluster. For example, for a user that is making mortgage payments that are above average, the system may generate a notification to the user with recommended activities including refinancing the mortgage to secure a lower interest rate and scheduling a call with an advisor. As another example, the user may be making purchases indicative of additions, in response, the system may generate a notification to the user with recommended activities including scheduling an appointment with a professional, creating a budget, or allowing spending limits or controls to be placed on their account. As another example, the user may have recently come into a large sum of money through another means as indicated by rampant or reckless spending and a recent influx of cash. In this scenario, the system may generate a notification to the user with recommended activities including reviewing resources for financial management or establishing a budget. By generating a notification to the user, the system may be able to help the user in these scenarios avoid negative consequences for executing predicted activities. Furthermore, the system can encourage the user to diverge from a projected future data stream.

At step 410, process 400 (e.g., using one or more components described above) compares the first projected future data stream to the second data stream to determine a measure of convergence. For example, the system may, in response to receiving a second data stream associated with the user, compare the first projected future data stream to the second data stream to determine a measure of convergence. For example, the system can receive data after the notification was generated to determine the efficacy of the recommended activities. As another example, if the system recommended securing a lower interest rate for a mortgage, the second data stream can include regular payments to the same account number in a lower amount indicating a lower interest rate for the mortgage. By comparing the first projected future data stream to the second data stream to determine a measure of convergence, the system may determine if the recommended activities were effective.

In some embodiments, the system may determine a measure of convergence and potentially generate a second projected future data stream. For example, the system may, in response to receiving a second data stream associated with the user, compare the first projected future data stream to the second data stream to determine a measure of convergence, and in response to determining that the measure of convergence does not exceed a threshold, generating, based on the second data stream, a second projected future data stream including potential future activities for the user. For example, if, over the course of 4 months, a user habitually clicks on links in unsolicited emails without verifying their legitimacy as shown in the first user data stream, the user could expose the network or digital assets to various security threats including viruses or worms. The system may generate a first projected data stream indicating that it is likely that the user continues to click the links in unsolicited emails. The system may cluster the user, based on the first data stream (e.g., the email interaction data from the last 4 months) into an intervention cluster. Based on the determination by the system to cluster the first data stream into an intervention cluster, the system may generate a notification that can include one or more user activities to execute to exist the intervention cluster (e.g., watching a mandatory phishing training video).

During the 4 months after the first data stream associated with the user, the system can receive a second data stream (e.g., a second stream of the user's email interaction data over 4 months). Based on the comparison of the first data stream and the second data stream, the system may generate, if the measure of convergence does not exceed a specified threshold, a second projected data stream based on the second data stream which could predict that the user will continue to click on links in unsolicited emails. The second projected future data stream (e.g., the email interaction data from the following 4 months) can include potential future activities for the user such as continuing to click on unsolicited emails, or other activities such as not setting a proper password or incorrectly configuring sharing properties. By determining the measure of convergence and generating the second projected future data stream, the system may be able to intercept undesired user activities or generate another notification with alternative intervention strategies (e.g., disabling a user account).

In some embodiments, the second data stream can be received after the first data stream. For example, the first data stream can correspond to a first period of time and the second data stream corresponds to a second period of time, wherein the second period of them occurs later than the first period of time. For example, the first data stream may correspond to a period of 1 month which could serve as a baseline for standard user spending. The system may receive a second data stream that shows increased healthcare costs. By receiving the second data stream after the first data stream, the system may be able to identify new activities the user is performing and react in a time-sensitive manner.

In some embodiments, the system may process the second projected future data stream to determine that the user is not associated with the original cluster. For example, the system may process, using a clustering algorithm, the second projected future data stream to determine that the user is no longer associated with the first cluster, and in response to determining that the user is no longer associated with the first cluster, generating a notification to the user indicating that the user has successfully exited the first cluster. For example, if the first data stream includes data about the user that suggests reckless spending, the notification to the user may have included one or more user activities to execute (e.g., create and adhere to a budget). The system may generate a second projected future data stream which could indicate that the user is no longer spending recklessly (e.g., the user could have followed one or more user activities to execute). By processing the second projected future data stream to determine that the user is not associated with the original cluster, the system may be able to help users out of their current cluster and into a non-intervention cluster.

In some embodiments, the system may access additional user activities from data from a third-party account. For example, the system may access data from a third-party account, wherein the third-party account is associated with the user, wherein the third-party account comprises additional user activities, and wherein the third-party account can be used for the first data stream or the second data stream. For example, the system may access a user's investment account which could include information about the user's investments or overall finances. By accessing additional user activities from data from a third-party account, the system may be able to improve the clustering of the projected future data stream and provide better user activities to execute in the notification.

In some embodiments, the system may generate a measure of convergence based on a comparison between the first projected data stream and the second data stream. For example, the system may process the first projected future data stream and the second data stream using a model to receive, as input, the first projected future data stream and the second data stream, perform a comparison between the first projected future data stream and the second data stream to identify user activities executed by the comparison of the first projected future data stream and the second data stream, generate an output corresponding to the user activities executed by the user associated with the first projected future data stream that is equivalent to potential future activities associated with the second data stream, and generating the measure of convergence using the output from the model. For example, the system may generate a first projected data stream that predicts a user will continue to perform undesired activities (e.g., clicking suspicious links or recklessly spending) and generate a notification to the user which includes one or more user activities to execute to exit the first cluster. The system may receive a second data stream (e.g., the user's activities after the notification). The system may compare the second data stream with the first projected data stream to determine if the user executed one or more of the recommended activities in the notification. If the user executed one or more of the recommended activities in the notification, it is likely that the measure of convergence will not exceed the threshold, indicating the user is no longer executing actions associated with the cluster. By comparing the first projected data stream and the second data stream to generate the measure of convergence, the system may be able to determine if the user performed one or more of the recommended activities or if the user did not perform the recommended actions and thus can update the user's cluster accordingly.

At step 412, process 400 (e.g., using one or more components described above) determines if the measure of convergence exceeds the convergence threshold. For example, the system may determine if that measure of convergence exceeds or does not exceed a threshold. For example, the system may determine that the measure of convergence exceeds the threshold, and therefore the system can extrapolate that the user may not have executed the user activities included in the notification to the user which included one or more user activities for the user to execute to exit the first cluster. If the value exceeds the threshold, the flowchart progresses to step 420. If the value does not exceed the threshold, the flowchart progresses to step 414.

At step 414, process 400 (e.g., using one or more components described above) generates a second projected future data stream, including potential future activities for the user. For example, the system may, in response to determining that the measure of convergence does not exceed a threshold, generate, based on the second data stream, a second projected future data stream including potential future activities for the user. For example, the system may generate a second projected future data stream that shows potential activities associated with a user if the activities from the generated notification are executed. By generating a second projected future data stream including potential future activities for the user, the system may be able to identify new clusters to determine if the user exited the initial cluster.

At step 416, process 400 (e.g., using one or more components described above) processes the second projected future data stream to determine that the user is no longer associated with the first cluster. For example, the system may process, using the clustering algorithm, the second projected future data stream to determine that the user is no longer associated with the first cluster. For example, if the user executed the recommended activities (e.g., refinancing a mortgage to secure a lower interest rate, allowing spending limits or controls to be placed on their account, or reviewing resources for financial management), they may exit the initial cluster into a non-intervention cluster. By processing the second projected future data stream to determine that the user is no longer associated with the first cluster, the system may determine if the activities of a user will lead to undesirable consequences. The process then goes to step 418.

At step 418, process 400 (e.g., using one or more components described above) generates a notification to the user indicating that the user has successfully exited the first cluster. For example, the system may, in response to determining that the user is no longer associated with the first cluster, generate a notification to the user indicating that the user has successfully exited the first cluster. For example, after determining that the user executed recommended activities (e.g., refinancing a mortgage to secure a lower interest rate, allowing spending limits or controls to be placed on their account, or reviewing resources for financial management), the system can generate a notification indicating to the user that they likely avoided undesirable consequences as a result of their activities. By generating a notification to the user indicating that the user has successfully exited the first cluster, the system may be able to notify the user of their achievement and prompt further activities that minimize the risk of undesirable consequences.

In some embodiments, the system may determine if a cluster is an intervention cluster. For example, the system may determine whether the first cluster is a type of intervention cluster that may require direction to the user for future activity. For example, the system may determine if the cluster is an intervention cluster by assessing the activity of users who are in the same cluster. As another example, if the system observes a first user who is recklessly spending (e.g., if the system identifies spending inconsistent with the user's earnings), the system may observe that the user's financial situation may deteriorate without system intervention. By making this observation, the system can train a model to cluster users with similar spending habits and identify activities that, when executed, can improve the spending habits of the user. For example, the system can generate a notification to a first user that includes a user activity directed at reducing spending by creating a budget, observe the first user executing the activity, and generate a similar notification for a second user who is spending recklessly. By determining if the cluster is an intervention cluster, the system may be able to better determine the activities for the user to execute to exit the first cluster and identify when a user is in need of assistance.

In some embodiments, the intervention cluster can include a user executing a negative activity. For example, the intervention cluster can include a user executing a negative activity, wherein the negative activity is an activity executed by the user whose consequence to the user can be mitigated with another activity associated with the intervention cluster. For example, the intervention cluster could include transaction activities that include one-time or ongoing payments such as unexpected large transactions (e.g., major home repairs, or vehicle repair), transactions indicating additions (e.g., gambling, alcohol, hoarding), transactions involving births or deaths (e.g., many transactions at a hospital or funeral home), or transactions involving weddings. Intervention clusters could include impulse spenders, over-leveraged borrowers, late payment users, or zero savings users. The intervention cluster could also include activities associated with network systems such as failing to change a login credential, failing to comply with a retention policy, failing to complete cybersecurity training modules, or failing to stop interacting with phishing emails. Intervention clusters could include phishing susceptible users, credential-sharing users, high-risk application users, or non-compliant users. The system may categorize activities into clusters that include an intervention cluster and a non-intervention cluster based on the severity of the transactions. For example, there could be a health event cluster where a large health event, as determined by the cost of the transactions may be clustered into an intervention health event cluster as opposed to a smaller health event, which may be clustered into a non-intervention health event cluster. By including an intervention cluster that includes a user executing a negative activity, the system may be able to identify users who executed negative activities which is useful in generating a specific notification that includes relevant user activities to execute to exit the cluster.

In some embodiments, the system may revoke or limit access to a user account. For example, the system may prevent the execution of future activities from the user by revoking or limiting access to an account associated with the user, wherein revoking or limiting access to the account includes restricting the execution of future activities by the user. For example, if a user is spending recklessly (e.g., if the system identifies spending as inconsistent with the user's earnings) the system may invalidate the credentials of the user or direct a third party to invalidate the credentials of a user. The system could invalidate the credentials temporarily or permanently. By restricting account access, the system may prevent a user from executing additional negative or undesired activities.

Additionally, if the value exceeds the threshold at step 412, the process leads instead to step 420. At step 420, process 400 (e.g., using one or more components described above) prevents the execution of future activities from the user. For example, in response to determining that the measure of convergence for the first data stream and the second data stream exceeds the threshold, the system may prevent the execution of future activities from the user. For example, the system may determine that the measure of convergence exceeds the convergence threshold, which may indicate that the data stream associated with the user is converging with the projected data stream (e.g., the user is continuing to perform negative or undesired actions). As a result, the system may prevent the user from executing any additional activities or accessing a system (e.g., prevent access to a financial account or a user account), thereby preventing the user from executing any activities. The system may prevent the user from accessing the system in various ways, including invalidating credentials or blacklisting a specific device. By preventing the execution of future activities from the user, the system may prevent undesired consequences associated with the execution of future activities (e.g., continuing to execute negative or undesired activities).

In some embodiments, the system may identify activities to include in a notification based on a plurality of similar users. For example, the system may identify a plurality of users and a second plurality of user activities, wherein the plurality of users is in the first cluster associated with the user, identifying notifications that were sent to the plurality of users, determining if the notifications included activities that mitigated one or more negative consequences by identifying activities associated with each user in the plurality of users before the notification, comparing the activities associated with each user in the plurality of users after the notification and after the user executed the activities suggested in the notification, and determining that the activities associated with each user in the plurality of users after the notification mitigated a negative consequence to the plurality of users, and generating a known notification to the user including one or more user activities to execute to exit the first cluster based on the notification associated with the plurality of users in the first cluster. For example, the system may provide a known notification to a user based on users with similar characteristics (e.g., users who are in the same cluster). As another example, if a first user and a second user are in an intervention cluster called phishing susceptible users and a notification was sent to the first user to watch a training video regarding phishing emails and a notification was sent to the second user to attend an in-person training session regarding phishing emails the system may observe different results based on the notification to the first user and the notification to the second user. For example, the first user may still be failing to identify and respond to phishing emails appropriately after the notification, however, the second user may have identified all phishing emails and reported them. Therefore, the system may ascertain that the notification send to the second user is more effective than the notification sent to the first user. Furthermore, if the system identifies a third user failing to adhere to the cybersecurity policies the system will be better able to recommend activities based on the responses from the first user and the second user: the system may recommend to the third user to attend an in-person training session. By determining that the activities after the notification mitigated a negative consequence to the plurality of users, the system may be able to provide more relevant and effective activities to execute to exit the first cluster.

In some embodiments, the system may access additional user activities from data from a third-party account corresponding to a second plurality of user activities. For example, the system may receive access to a third-party account associated with the user, wherein the third-party account comprises a second plurality of user activities executed by the user. For example, the third-party account may be a bank account, an investment portfolio, a social media account, or a network account. By accessing additional user activities, the system may be able to provide notification with more relevant user activities to execute to exit the cluster.

In some embodiments, the system may use the activities of users in the same cluster to generate the projected future data stream. For example, the system may identify a plurality of users and a second plurality of user activities, wherein the plurality of users is in the first cluster associated with the user. The system may generate the first projected future data stream based on the plurality of users and the second plurality of user activities. For example, the system may generate a projected future data stream based on the activities of similar users in the cluster. For example, the system may generate the projected future data stream based on observing multiple installments on a payment plan that may be made by a user in the plurality of users in a cluster which could indicate future payments. By using the activities of users in the same cluster to generate the projected future data stream, the system may be better able to predict user activities and cluster similar users together thereby leading to more effective recommended user activities for similar users to execute accordingly.

In some embodiments, the system may generate synthetic user activity data. For example, the system may identify a plurality of users and a second plurality of user activities, wherein the plurality of users is in the first cluster associated with the user, and train a model to generate the synthetic data stream based on the second plurality of user activities corresponding to each user of the plurality of users. For example, a synthetic data stream can be generated based on other users in the same cluster. The synthetic data stream could be generated based on the first data stream of the user in conjunction with the aggregated data streams from other users in the cluster thereby improving the predicted activities of the user. By generating synthetic user activity data, the system may improve notification accuracy over just using the characteristics of the first data stream.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method comprising: receiving a first data stream including a plurality of user activities executed by a user; generating a first projected future data stream including potential future activities; determining a first cluster to associate with the user; determining that the first cluster is a type of intervention cluster and generating a notification to the user including one or more user activities to execute to exit the first cluster; in response to receiving a second data stream associated with the user, comparing the first projected future data stream to the second data stream to determine a measure of convergence; in response to determining that the measure of convergence does not exceed a threshold, generating, based on the second data stream, a second projected future data stream including potential future activities for the user; processing, using a clustering algorithm, the second projected future data stream to determine that the user is no longer associated with the first cluster; and in response to determining that the user is no longer associated with the first cluster, generating a notification to the user indicating that the user has successfully exited the first cluster.

2. A method for directing future activity to diverge from a projected future data stream generated based on past activity, comprising: in response to receiving a first data stream including a plurality of user activities executed by a user, generating, based on the first data stream, a first projected future data stream including potential future activities for the user; processing, using a clustering algorithm, the first projected future data stream to determine, from a plurality of clusters, a first cluster to associate with the user; determining whether the first cluster is a type of intervention cluster requiring direction to the user for future activity; and in response to determining that the first cluster is a type of intervention cluster, generating a notification to the user including one or more user activities to execute to exit the first cluster.

3. A method comprising: in response to receiving a first data stream including a plurality of user activities executed by a user, generating, based on the first data stream, a first projected future data stream including potential future activities for the user; determining, from a plurality of clusters, a first cluster to associate with the user; determining whether the first cluster is a type of intervention cluster; and in response to determining that the first cluster is a type of intervention cluster, generating a notification to the user including one or more user activities to execute to exit the first cluster.

4. The method of any one of the preceding embodiments, further comprising, in response to receiving a second data stream associated with the user, comparing the first projected future data stream to the second data stream to determine a measure of convergence, and in response to determining that the measure of convergence does not exceed a threshold, generating, based on the second data stream, a second projected future data stream including potential future activities for the user.

5. The method of any one of the preceding embodiments, wherein the first data stream corresponds to a first period of time and the second data stream corresponds to a second period of time, wherein the second period of them occurs later than the first period of time.

6. The method of any one of the preceding embodiments, further comprising processing, using a clustering algorithm, the second projected future data stream to determine that the user is no longer associated with the first cluster, and in response to determining that the user is no longer associated with the first cluster, generating a notification to the user indicating that the user has successfully exited the first cluster.

7. The method of any one of the preceding embodiments, wherein an intervention cluster includes a user executing a negative activity, wherein the negative activity is an activity executed by the user whose consequence to the user can be mitigated with another activity associated with the intervention cluster.

8. The method of any one of the preceding embodiments, wherein generating a notification to the user including one or more user activities to execute for exiting the first cluster, further comprises: identifying a plurality of users and a second plurality of user activities, wherein the plurality of users is in the first cluster associated with the user; identifying notifications that were sent to the plurality of users; determining if the notifications included activities that mitigated one or more negative consequences by: identifying activities associated with each user in the plurality of users before the notification; comparing the activities associated with each user in the plurality of users after the notification and after the user executed the activities suggested in the notification; and determining that the activities associated with each user in the plurality of users after the notification mitigated a negative consequence to the plurality of users; and generating a known notification to the user including one or more user activities to execute to exit the first cluster based on the notification associated with the plurality of users in the first cluster.

9. The method of any one of the preceding embodiments, further comprising accessing data from a third-party account, wherein the third-party account is associated with the user, wherein the third-party account comprises additional user activities, and wherein the third-party account can be used for the first data stream or the second data stream.

10. The method of any one of the preceding embodiments, wherein receiving the first data stream further comprises receiving access to a third-party account associated with the user, wherein the third-party account comprises a second plurality of user activities executed by the user.

11. The method of any one of the preceding embodiments, wherein comparing the first projected future data stream to the second data stream to determine a measure of convergence further comprises: processing the first projected future data stream and the second data stream using a model to: receive, as input, the first projected future data stream and the second data stream; perform a comparison between the first projected future data stream and the second data stream to identify user activities executed by the comparison of the first projected future data stream and the second data stream; generate an output corresponding to the user activities executed by the user associated with the first projected future data stream that is equivalent to potential future activities associated with the second data stream; and generating the measure of convergence using the output from the model.

12. The method of any one of the preceding embodiments, wherein the first projected future data stream is generated by: identifying a plurality of users and a second plurality of user activities, wherein the plurality of users is in the first cluster associated with the user; and generating the first projected future data stream based on the plurality of users and the second plurality of user activities.

13. The method of any one of the preceding embodiments, further comprising: in response to determining that the measure of convergence for the first data stream and the second data stream exceeds the threshold, preventing execution of future activities from the user.

14. The method of any one of the preceding embodiments, wherein determining the first cluster further comprises, determining whether the first cluster is a type of intervention cluster requiring direction to the user for future activity.

15. The method of any one of the preceding embodiments, wherein preventing execution of future activities from the user comprises revoking or limiting access to an account associated with the user, wherein revoking or limiting access to the account includes restricting execution of future activities by the user.

16. The method of any one of the preceding embodiments, wherein the projected future data stream is a synthetic data stream, and wherein the synthetic data stream is generated by: identifying a plurality of users and a second plurality of user activities, wherein the plurality of users is in the first cluster associated with the user; and training a model to generate the synthetic data stream based on the second plurality of user activities corresponding to each user of the plurality of users.

17. One or more non-transitory, computer-readable media storing instructions that when executed by one or more processors cause operations comprising those of any of embodiments 1-16.

18. A system comprising one or more processors; and memory storing instructions that, when executed by the processors, cause the processors to effectuate operations comprising those of any of embodiments 1-16.

19. A system comprising means for performing any of embodiments 1-16.

What is claimed is:

1. A system for directing future activity to diverge from a projected future data stream generated based on past activity, comprising:

one or more processors; and one or more non-transitory, computer-readable media storing instructions that when executed by the one or more processors cause operations comprising:

determining, based on a first data stream associated with a user, to associate the user with a first cluster that is a type of intervention cluster that indicates that the user is performing one or more activities that require intervention;

generating, based on determining to associate the user with a first cluster, a notification that identifies one or more user activities for the user to execute to exit the first cluster;

in response to receiving a second data stream associated with the user, comparing a first projected future data stream to the second data stream to determine a measure of convergence;

in response to determining that the measure of convergence does not exceed a threshold, generating, based on the second data stream, a second projected future data stream that identifies potential future activities for the user;

processing, using a clustering algorithm, the second projected future data stream to determine that the user is no longer associated with the first cluster; and in response to determining that the user is no longer associated with the first cluster, generating a notification to the user indicating that the user has successfully exited the first cluster.

2. A computer-implemented method for directing future activity to diverge from a projected future data stream generated based on past activity, comprising:

in response to receiving a first data stream including a plurality of user activities executed by a user, generating, based on the first data stream, a first projected future data stream including potential future activities for the user;

processing, using a clustering algorithm, the first projected future data stream to determine, from a plurality of clusters, a first cluster to associate with the user, wherein the first cluster is a type of intervention cluster that indicates that the user requires intervention;

in response to determining the first cluster, generating a notification to the user including one or more user activities to execute to exit the first cluster;

determining a measure of convergence based on the first projected future data stream; and determining whether the measure of convergence exceeds a threshold.

3. The computer-implemented method of claim 2, further comprising:

generating, based on a second data stream used to determine the measure of convergence and based on determining that the measure of convergence does not exceed a threshold, a second projected future data stream including potential future activities for the user.

4. The computer-implemented method of claim 2, wherein determining the measure of convergence based on the first projected future data stream comprises:

comparing the first projected future data stream to a second data stream to determine the measure of convergence, wherein the first data stream corresponds to a first period of time and the second data stream corresponds to a second period of time, and wherein the second period of them occurs later than the first period of time.

5. The computer-implemented method of claim 3, further comprising:

processing, using a clustering algorithm, the second projected future data stream to determine that the user is no longer associated with the first cluster; and in response to determining that the user is no longer associated with the first cluster, generating a notification to the user indicating that the user has successfully exited the first cluster.

6. The computer-implemented method of claim 2, wherein the type of intervention cluster indicates that the user is executing a negative activity, wherein the negative activity is an activity executed by the user whose consequence to the user can be mitigated with the one or more user activities.

7. The computer-implemented method of claim 2, wherein further comprising:

identifying a plurality of users and a second plurality of user activities, wherein the plurality of users is in the first cluster associated with the user;

identifying notifications that were sent to the plurality of users; and determining that the one or more user activities were identified by the notifications and mitigated one or more negative consequences.

8. The computer-implemented method of claim 2, further comprising:

accessing data from a third-party account, wherein the third-party account is associated with the user, wherein the third-party account comprises additional user activities, and wherein the third-party account can be used for the first data stream or a second data stream.

9. The computer-implemented method of claim 2, wherein receiving the first data stream further comprises receiving access to a third-party account associated with the user, wherein the third-party account comprises a second plurality of user activities executed by the user.

10. The computer-implemented method of claim 2, wherein determining the measure of convergence comprises:

processing the first projected future data stream and a second data stream using a model to:

receive, as input, the first projected future data stream and the second data stream;

perform a comparison between the first projected future data stream and the second data stream to identify user activities executed by the comparison of the first projected future data stream and the second data stream; and generate an output corresponding to the user activities executed by the user associated with the first projected future data stream that is equivalent to potential future activities associated with the second data stream; and generating the measure of convergence using the output from the model.

11. The computer-implemented method of claim 2, wherein the first projected future data stream is generated by:

identifying a plurality of users and a second plurality of user activities, wherein the plurality of users is in the first cluster associated with the user; and generating the first projected future data stream based on the plurality of users and the second plurality of user activities.

12. The computer-implemented method of claim 2, further comprising:

preventing, based on determining that the measure of convergence exceeds the threshold, execution of future activities from the user.

13. The computer-implemented method of claim 2, wherein the type of intervention cluster indicates that the user requires direction for future activity.

14. The computer-implemented method of claim 12, wherein preventing the execution of the future activities comprises revoking or limiting access to an account associated with the user, wherein revoking or limiting access to the account includes restricting execution of future activities by the user.

15. The computer-implemented method of claim 2, wherein the projected future data stream is a synthetic data stream, and wherein the synthetic data stream is generated by:

identifying a plurality of users and a second plurality of user activities, wherein the plurality of users is in the first cluster associated with the user; and training a model to generate the synthetic data stream based on the second plurality of user activities corresponding to each user of the plurality of users.

16. One or more non-transitory, computer-readable media storing instructions that when executed by one or more processors cause operations comprising:

in response to receiving a first data stream based on a plurality of user activities executed by a user, generating, based on the first data stream, a first projected future data stream including potential future activities for the user;

determining to associate the user; with an intervention cluster that indicates that the user is performing at least one activity, of the plurality of user activities, that requires intervention;

generating, based on determining to associate the user with a first cluster, a notification that identifies one or more user activities for the user to execute to exit the first cluster;

comparing the first projected future data stream to a second data stream to determine a measure of convergence; and determining whether the measure of convergence exceeds a threshold.

17. The one or more non-transitory, computer-readable media of claim 16, wherein the intervention includes direction to the user for future activity.

18. The one or more non-transitory, computer-readable media of claim 16, wherein the first projected future data stream is a synthetic data stream, and wherein the synthetic data stream is generated by:

training a model to generate the synthetic data stream based on a second plurality of user activities corresponding to a plurality of other users associated with the intervention cluster.

19. The one or more non-transitory, computer-readable media of claim 16, wherein the at least one activity is a negative activity whose consequence to the user can be mitigated with another activity of the one or more user activities.

20. The one or more non-transitory, computer-readable media of claim 16, wherein the first projected future data stream is generated by:

generating the first projected future data stream based on a plurality of other users associated with the intervention cluster.

* * * * *